United States Patent
Jeong et al.

(10) Patent No.: US 9,464,212 B2
(45) Date of Patent: Oct. 11, 2016

(54) ADHESIVE COMPOSITION AND OPTICAL MEMBER USING THE SAME

(75) Inventors: Woo Jin Jeong, Uiwang-si (KR); Chul Jeong, Uiwang-si (KR); Ri Ra Jung, Uiwang-si (KR); Hee Yeon Ki, Uiwang-si (KR)

(73) Assignee: CHEIL INDUSTRIES, INC., Gumi-si, Gyeongsangbuk-do (KR)

( * ) Notice: Subject to any disclaimer, the term of this patent is extended or adjusted under 35 U.S.C. 154(b) by 352 days.

(21) Appl. No.: 13/241,307

(22) Filed: Sep. 23, 2011

(65) Prior Publication Data

US 2012/0171480 A1 Jul. 5, 2012

(30) Foreign Application Priority Data

Dec. 29, 2010 (KR) ........................ 10-2010-0138346

(51) Int. Cl.
- C09J 133/06 (2006.01)
- C08L 33/06 (2006.01)
- C09J 7/02 (2006.01)

(52) U.S. Cl.
CPC ............ C09J 7/0246 (2013.01); C09J 133/06 (2013.01); C09J 2201/622 (2013.01); C09J 2203/318 (2013.01); C09J 2433/00 (2013.01); Y10T 428/28 (2015.01)

(58) Field of Classification Search
None
See application file for complete search history.

(56) References Cited

U.S. PATENT DOCUMENTS

| | | | |
|---|---|---|---|
| 5,795,650 A | 8/1998 | Watanabe et al. | |
| 6,447,900 B1 * | 9/2002 | Ohtani et al. | 428/355 AC |
| 6,630,239 B2 * | 10/2003 | Cernohous et al. | 428/355 R |
| 7,049,001 B2 * | 5/2006 | Haberle et al. | 428/423.1 |
| 2006/0036040 A1 * | 2/2006 | Takeko | C09J 133/04 525/192 |
| 2006/0162857 A1 * | 7/2006 | Nagamoto et al. | 156/272.8 |
| 2007/0166537 A1 * | 7/2007 | Nagamoto et al. | 428/355 AC |
| 2007/0218276 A1 * | 9/2007 | Hiramatsu et al. | 428/354 |
| 2008/0023132 A1 * | 1/2008 | Sano et al. | 156/275.7 |
| 2008/0033095 A1 * | 2/2008 | Takahashi et al. | 524/460 |
| 2008/0261039 A1 * | 10/2008 | Tanaka et al. | 428/352 |
| 2009/0099298 A1 * | 4/2009 | Yukawa | 524/506 |
| 2010/0028671 A1 * | 2/2010 | Mitsui et al. | 428/354 |
| 2010/0080991 A1 | 4/2010 | Kishioka et al. | |
| 2010/0167073 A1 * | 7/2010 | Kitakatsu | 428/473.5 |
| 2010/0209703 A1 * | 8/2010 | Takarada et al. | 428/355 AC |

(Continued)

FOREIGN PATENT DOCUMENTS

| | | |
|---|---|---|
| JP | 3-272921 B2 | 4/2002 |
| JP | 2006-077224 A | 3/2006 |

(Continued)

OTHER PUBLICATIONS

Human translation of JP 2009221324 A (2009).*

(Continued)

*Primary Examiner* — Frank D Ducheneaux
(74) *Attorney, Agent, or Firm* — Lee & Morse, P.C.

(57) ABSTRACT

An adhesive composition and an optical member using the same, the adhesive composition providing an adhesive having a storage modulus of about $8 \times 10^5$ to about $1 \times 10^8$ dyne/cm$^2$ and a gel fraction of about 83% to about 95% as defined by Equation 1:

Gel fraction (%)=($A/B$)×100,        [Equation 1]

in Equation 1, A is a mass measured after dissolving the adhesive at 23° C. for 48 hours in a solvent and then drying for 24 hours, and B is an initial mass.

9 Claims, 2 Drawing Sheets

(56) References Cited

U.S. PATENT DOCUMENTS

| | | | | |
|---|---|---|---|---|
| 2010/0328584 | A1* | 12/2010 | Toyama et al. | 349/96 |
| 2011/0135924 | A1* | 6/2011 | Takahira et al. | 428/355 R |
| 2011/0135935 | A1* | 6/2011 | Adachi et al. | 428/422.8 |
| 2011/0234948 | A1 | 9/2011 | Yoon et al. | |
| 2011/0236605 | A1* | 9/2011 | Hattori et al. | 428/1.55 |
| 2012/0246666 | A1* | 9/2012 | Taya et al. | 720/695 |

FOREIGN PATENT DOCUMENTS

| | | |
|---|---|---|
| JP | 2006-133606 A | 5/2006 |
| JP | 2007-100041 A | 4/2007 |
| JP | 2007-176961 A | 7/2007 |
| JP | 2007-197659 A | 8/2007 |
| JP | 2009-221324 A | 10/2009 |
| JP | 2009-299047 A | 12/2009 |
| KR | 2003-0069461 A | 8/2003 |
| KR | 10 2009-0072868 A | 7/2009 |
| KR | 10 2010-0070999 A | 6/2010 |
| KR | 10-0983026 B1 | 9/2010 |
| TW | 200609323 | 3/2006 |
| TW | 201035264 A | 10/2010 |
| WO | WO 03/070849 A1 | 8/2003 |
| WO | WO 2010016514 A1 * | 2/2010 |
| WO | WO 2010018872 A1 * | 2/2010 |
| WO | WO 2010/024103 A1 | 3/2010 |
| WO | WO 2010024103 A1 * | 3/2010 |
| WO | WO 2010/071383 A2 | 6/2010 |

OTHER PUBLICATIONS

Chinese Office Action in CN 201110298094.1, dated Jul. 15, 2013, with English Translation (Jeong, et al.).
Chinese Office Action dated Feb. 8, 2014.
Taiwanese Office Action dated Oct. 3, 2013.
Japanese Office Action dated Nov. 24, 2015 in Corresponding Japanese Patent Application No. 2011-210719.

* cited by examiner

FIG. 2

Table 1

| Evaluation Item | | Example 1 | Example 2 | Example 3 | Comparative Example 1 | Comparative Example 2 | Comparative Example 3 | Comparative Example 4 |
|---|---|---|---|---|---|---|---|---|
| (A) | A1 | 100 | 75 | 50 | 25 | - | 100 | - |
| | A2 | - | 25 | 50 | 75 | 100 | - | 100 |
| Isocyanate crosslinking agent | | 4.5 | 4.5 | 4.5 | 4.5 | 4.5 | 0.5 | 0.5 |
| Imide crosslinking agent | | 0.02 | 0.02 | 0.02 | 0.02 | 0.02 | 0.02 | 0.02 |
| Coupling agent | | 0.06 | 0.06 | 0.06 | 0.06 | 0.06 | 0.06 | 0.06 |
| Gel fraction | | 89 | 85 | 83 | 91 | 62 | 70 | 68 |
| Appearance | | good | good | good | bad | Good | good | good |
| Peel strength (gf/25 mm) | | 320 | 350 | 330 | 340 | 290 | 480 | 389 |
| Reworkability/cutability | | ○/○ | ○/○ | ○/○ | ○/△ | ○/△ | ○/× | ○/○ |
| Light leakage(ΔL) | | 0.8 | 0.4 | 0.9 | 0.9 | 0.6 | 1.2 | 1.0 |
| Creep(mm) | | 0.03 | 0.04 | 0.045 | 0.042 | 0.28 | 0.42 | 0.35 |
| Tack(gf) | | 114 | 110 | 90 | 70 | 68 | 125 | 95 |
| reliability | Heat resistance (85 °C) | ○ | ○ | ○ | ○ | ○ | ○ | ○ |
| | Thermal/humidity resistance (60 °C, 95%RH) | ○ | ○ | ○ | × | × | ○ | ○ |
| | Thermal impact (−40 °C →65 °C) | ○ | ○ | ○ | × | × | ○ | × |
| Storage modulus (25 °C,dyne/cm$^2$) | | 1×10$^7$ | 5×10$^6$ | 9×10$^5$ | 7×10$^5$ | 2×10$^5$ | 5×10$^4$ | 8×10$^4$ |

ADHESIVE COMPOSITION AND OPTICAL MEMBER USING THE SAME

BACKGROUND

1. Field

Embodiments relate to an adhesive composition and an optical member using the same.

2. Description of the Related Art

Optical films may include, e.g., a polarizing plate, color filter, phase difference film, elliptic polarization film, reflective film, anti-reflective film, compensation film, brightness-improving film, alignment film, diffusion film, shatter preventing film, surface-protective film, plastic LCD substrate, and the like. Such optical films may be used in various optical members, e.g., LCD display devices.

SUMMARY

Embodiments are directed to an adhesive composition and an optical member using the same.

The embodiments may be realized by providing an adhesive composition, the adhesive composition providing an adhesive having a storage modulus of about $8 \times 10^5$ to about $1 \times 10^8$ dyne/cm$^2$ and a gel fraction of about 83% to about 95% as defined by Equation 1:

$$\text{Gel fraction (\%)} = (A/B) \times 100, \quad \text{[Equation 1]}$$

in Equation 1, A is a mass measured after dissolving the adhesive at 23° C. for 48 hours in a solvent and then drying for 24 hours, and B is an initial mass.

The adhesive composition may include a crosslinking agent and a (meth)acrylate copolymer, the (meth)acrylate copolymer including a first (meth)acrylate resin having a glass transition temperature of about 200 K to about 250 K, and a second (meth)acrylate resin having a glass transition temperature of about 250 K to about 300 K.

The (meth)acrylate copolymer may include about 50 to less than 100 wt % of the first (meth)acrylate resin and, greater than 0 to about 50 wt % of the second (meth)acrylate resin.

The second (meth)acrylate resin may be copolymerized with a monomer having a glass transition temperature of about 253.15 K to about 423.15 K.

The monomer having a glass transition temperature of about 253.15 K to about 423.15 K may include at least one of methylmethacrylate, methylacrylate, butylmethacrylate, and isobutylmethacrylate.

The first (meth)acrylate resin may have a weight average molecular weight of about 800,000 to about 3,000,000 g/mol, and the second (meth)acrylate resin may have a weight average molecular weight of about 100,000 to about 1,200,000 g/mol.

The second (meth)acrylate resin may have a weight average molecular weight of about 500,000 to about 1,200,000 g/mol.

The first (meth)acrylate resin may be prepared by polymerization of a monomer mixture, the monomer mixture including a $C_{1-20}$ alkyl(meth)acrylate, a monomer having a hydroxyl group, and a monomer having a carboxyl group, and the second (meth)acrylate resin may be prepared by polymerization of another monomer mixture, the other monomer mixture including a $C_{1-20}$ alkyl(meth)acrylate, a monomer having a hydroxyl group, and a monomer having a carboxyl group.

The adhesive composition may include 100 parts by weight of a (meth)acrylate copolymer; about 1 to about 10 parts by weight of a crosslinking agent; and about 0.01 to about 5 parts by weight of a silane coupling agent.

The crosslinking agent may include an isocyanate crosslinking agent and an imide-based crosslinking agent.

The crosslinking agent may include the isocyanate crosslinking agent and the imide-based crosslinking agent in a ratio of about 100:1 to about 350:1.

The crosslinking agent may include about 3 to about 9 parts by weight of the isocyanate crosslinking agent and about 0.01 to about 1 parts by weight of the imide-based crosslinking agent.

The embodiments may also be realized by providing an optical member including an adhesive layer on at least one side of an optical film, the adhesive layer being prepared from the adhesive composition of an embodiment.

The optical member may have a brightness difference ΔL of less than about 1 between edge portions thereof and a center portion thereof, the brightness difference ΔL being defined by the following Equation 2:

$$\Delta L = [(a+b+d+e)/4] - c, \quad \text{[Equation 2]}$$

in Equation 2, a, b, d, and e are average brightnesses in an area occupying 1/16 of a total area from an end of each side of the optical member, and c is an average brightness in an area occupying 1/32 of the total area at a center portion of the optical member

BRIEF DESCRIPTION OF THE DRAWINGS

The embodiments will become more apparent to those of ordinary skill in the art by describing in detail exemplary embodiments with reference to the attached drawings, in which:

FIG. 2 illustrates Table 1, showing compositions and experimental results according to the Examples and Comparative Examples.

DETAILED DESCRIPTION

Figure 1:
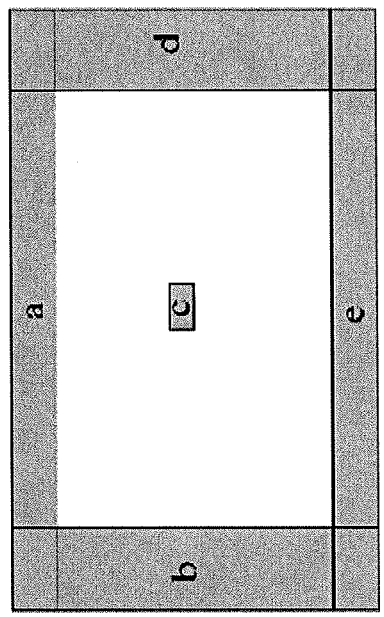
FIG. 1 illustrates a plan view of an LCD device showing measurement points for determining brightness.

Korean Patent Application No. 10-2010-0138346, filed on Dec. 29, 2010, in the Korean Intellectual Property Office, and entitled: "Adhesive Composition and Optical Member Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present.

An embodiment provides an adhesive composition. In an implementation, the adhesive composition may include, e.g., a methacrylate copolymer and a crosslinking agent. In another implementation, the adhesive composition may further include a silane coupling agent.

(Meth)Acrylate Copolymer

The (meth)acrylate copolymer may include (A1) a first (meth)acrylate resin having a glass transition temperature of about 200K to about 250K and (A2) a second (meth)acrylate resin having a glass transition temperature of about 250K to about 300K.

In an implementation, the (meth)acrylate copolymer may include about 50 to less than 100 wt % of the first (meth) acrylate resin (having a glass transition temperature of about 200K to about 250K, (A1)) and greater than 0 to about 50 wt % of the second (meth)acrylate resin (having a glass transition temperature of about 250K to about 300K, (A2)). For example, the (meth)acrylate copolymer may include about 55 to about 98 wt % of the first (meth)acrylate resin and about 2 to about 45 wt % of the second (meth)acrylate resin. In an implementation, the (meth)acrylate copolymer may include about 70 to about 95 wt % of the first (meth) acrylate resin and about 5 to about 30 wt % of the second (meth)acrylate resin. Within the range, the adhesive composition may provide excellent properties to an optical member (prepared using the adhesive composition) in terms of appearance, cutability, and low light leakage. Further, the adhesive composition may be used to prepare an adhesive that exhibits excellent adhesion and reliability.

The first (meth)acrylate resin (A1) may be prepared by polymerization of a monomer mixture including, e.g., a $C_{1-20}$ alkyl(meth)acrylate, a monomer having a hydroxyl group, and a monomer having a carboxyl group. For example, the first (meth)acrylate resin (A1) may be prepared by polymerization of a monomer mixture including about 70 to about 99 wt % of the $C_{1-20}$ alkyl(meth)acrylate, about 0.01 to about 20 wt % of the monomer having a hydroxyl group, and about 0.01 to about 10 wt % of the monomer having a carboxyl group. The first (meth)acrylate resin (A1) may have a glass transition temperature of about 200K to about 250K, e.g., about 210K to about 230K.

The second (meth)acrylate resin (A2) may be prepared by polymerization of a monomer mixture including, e.g., a $C_{1-20}$ alkyl(meth)acrylate, a monomer having a hydroxyl group, and a monomer having a carboxyl group. Some of the $C_{1-20}$ alkyl(meth)acrylate may be substituted by or include a monomer having a glass transition temperature of about 253.15 K to about 423.15 K in order to ensure that the second (meth)acrylate resin has a glass transition temperature of about 250K to about 300K. The second (meth) acrylate resin (A2) may have a glass transition temperature of about 250K to about 300K, e.g., about 255K to about 275K.

For example, the second (meth)acrylate resin (A2) may be prepared by polymerization of a monomer mixture including about 70 to about 99 wt % of the $C_{1-20}$ alkyl(meth)acrylate, about 0.01 to about 20 wt % of the monomer having a hydroxyl group, and about 0.01 to about 10 wt % of the monomer having a carboxyl group. The $C_{1-20}$ alkyl(meth) acrylate may contain about 50 wt % or less, e.g., about 45 wt % or less, of an alkyl(meth)acrylate monomer having a glass transition temperature of about 253.15 K to about 423.15 K. In an implementation, the alkyl(meth)acrylate monomer having a glass transition temperature of about 253.15 K to about 423.15 K may be present in an amount of about 1 to about 42 wt %, e.g., about 10 to about 40 wt %, in the $C_{1-20}$ alkyl(meth)acrylate monomer.

The monomer having a glass transition temperature of about 253.15 K to about 423.15 K may include, without being limited to, methylmethacrylate, methylacrylate, butylmethacrylate, isobutylmethacrylate, and/or combinations thereof.

The first (meth)acrylate resin may have a weight average molecular weight of about 800,000 to about 3,000,000 g/mol, e.g., about 1,000,000 to about 2,500,000 g/mol. In an implementation, the first (meth)acrylate resin (A1) may have a weight average molecular weight of about 1,200,000 to about 2,000,000 g/mol.

The second (meth)acrylate may have a weight average molecular weight of about 100,000 to about 1,200,000 g/mol, e.g., about 300,000 to about 1,000,000 g/mol. In an implementation, the second (meth)acrylate resin (A2) may have a weight average molecular weight of about 500,000 to about 950,000 g/mol.

The $C_{1-20}$ alkyl(meth)acrylate may include at least one selected from the group of, without being limited to, methyl (meth)acrylate, ethyl(meth)acrylate, propyl(meth)acrylate, butyl(meth)acrylate, pentyl(meth)acrylate, hexyl(meth) acrylate, heptyl(meth)acrylate, octyl(meth)acrylate, nonyl (meth)acrylate, decyl(meth)acrylate, dodecyl(meth)acrylate, lauryl(meth)acrylate, and combinations thereof. Herein, it should be noted that "(meth)acrylate" includes both acrylate and methacrylate.

Examples of the monomer having a hydroxyl group may include, without being limited to, 2-hydroxyethyl(meth) acrylate, 4-hydroxybutyl(meth)acrylate, 2-hydroxypropyl (meth)acrylate, 2-hydroxybutyl(meth)acrylate, 6-hydroxyhexyl(meth)acrylate, 1,4-cyclohexanediethanol mono(meth) acrylate, chloro-2-hydroxypropylacrylate, diethylene glycol mono(meth)acrylate, allyl alcohol, and the like. The monomer having a hydroxyl group may be present in an amount of about 0.01 to about 20 wt %, based on a total weight of monomer components. In an implementation, the monomer having a hydroxyl group may be present in an amount of about 0.5 to about 10 wt %, e.g., about 1 to about 7.5 wt %, based on the total weight of monomer components. For example, the monomer having a hydroxyl group may be present in an amount of about 1 to about 5 wt %, based on the total weight of monomer components.

Examples of the monomer having a carboxyl group may include (meth)acrylic acid, 2-carboxyethyl(meth)acrylate, 3-carboxypropyl(meth)acrylate, 4-carboxybutyl(meth)acrylate, itaconic acid, crotonic acid, maleic acid, fumaric acid, maleic anhydride, and the like. The monomer having a carboxyl group may be included in an amount of about 0.01 to about 10 wt %, e.g., about 0.1 to about 3 wt %, based on the total weight of monomer components.

Crosslinking Agent

The crosslinking agent may include a combination of an isocyanate crosslinking agent and an imide-based crosslinking agent.

The crosslinking agent may include the isocyanate crosslinking agent and the imide-based crosslinking agent in a ratio of about 100:1 to about 350:1, e.g., about 200:1 to about 300:1. Within the range, a stable decrease of curing time may be achieved.

In an implementation, the crosslinking agent may include a mixture of about 3 to about 9 parts by weight of the isocyanate crosslinking agent and about 0.01 to about 1 part by weight of the imide-based crosslinking agent, based on 100 parts by weight of the (meth)acrylate copolymer. Within the range, the adhesive composition may form an adhesive that exhibits excellent adhesion and peel strength and may provide low light leakage.

The isocyanate crosslinking agent may include, e.g., toluene diisocyanate, xylene diisocyanate, diphenylmethane diisocyanate, hexamethylene diisocyanate, isoform diisocyanate, tetramethylxylene diisocyanate, naphthalene diisocyanate, or polyols thereof (e.g., trimethylolpropane), but is not necessarily limited thereto. In an implementation, there may be used: aromatic diisocyanates such as 2,4-tolylenediisocyanate (2,4-TDI), 2,6-tolylenediisocyanate (2,6-TDI), 4,4'-diphenylmethane diisocyanate (4,4'-MDI), 2,4'-diphenylmethane diisocyanate (2,4'-MDI), 1,4-phenylene diisocyanate, xylylene diisocyanate (XDI), tetramethyl xylylene diisocyanate (TMXDI), tolidine diisocyanate (TODD and 1,5-naphthalene diisocyanate (NDI); aliphatic diisocyanates such as hexamethylenediisocyanate (HDI), trimethylhexamethylenediisocyanate (TMHDI), lysinediisocyanate and methyl norbornane diisocyanate (NBDI); alicyclic diisocyanates such as trans-cyclohexane-1,4-diisocyanate, isophorone diisocyanate (IPDI), H6-XDI (hydrogenated xylylene diisocyanate) and H12-MDI (hydrogenated diphenylmethane diisocyanate); and carbodiimide-modified diisocyanates or isocyanurate-modified diisocyanates of the above diisocyanates. In addition, adducts of the foregoing isocyanate compounds and polyol compounds, e.g., trimethylolpropane, biurets, and/or isocyanurates of the isocyanate compounds may be used. These may be used alone or in combination of two or more kinds thereof.

The isocyanate compounds may be synthesized or may be commercially available products.

Examples of the commercially available isocyanate crosslinking agents may include COLONATE L (trimethylolpropane/tolylene diisocyanate trimer adducts), COLONATE HL (trimethylolpropane/hexamethylene diisocyanate trimer adducts), COLONATE HX (isocyanurates of hexamethylene diisocyanate), COLONATE 2030, COLONATE 2031 (Nippon Polyurethane Industry Co., Ltd.), TAKENATE D-102 (registered trade name), TAKENATE D-110N (registered trade name), TAKENATE D-200 (registered trade name), TAKENATE D-202 (registered trade name, manufactured by Mitsui Chemicals Inc.), DURANATE 24A-100 (trade name), DURANATE TPA-100 (trade name), DURANATE TKA-100 (trade name), DURANATE P301-75E (trade name), DURANATE E402-90T (trade name), DURANATE E405-80T (trade name), DURANATE TSE-100 (trade name), and DURANATE D-101, DURANATE™ D-201 (trade name, manufactured by Asahi Kasei Corporation).

The imide-based crosslinking agent may include, e.g., carbodiimide, but is not limited thereto. For example, a compound having at least two carbodiimide groups (—N═C═N—) may be used, and any polycarbodiimide known in the art may be used. Specifically, a diisocyanate compound including at least two carbodiimide groups is preferably used.

Further, the carbodiimide compound may include high molecular weight polycarbodiimide prepared by decarbonation condensation reaction of diisocyanate in the presence of a carbodiimide catalyst. Examples of the compound may include compounds obtained by decarbonation condensation reaction of the following diisocyanates.

The diisocyanates include 4,4'-diphenylmethane diisocyanate, 3,3'-dimethoxy-4,4'-diphenylmethane diisocyanate, 3,3'-dimethyl-4,4'-diphenylmethane diisocyanate, 4,4'-diphenylether diisocyanate, 3,3'-dimethyl-4,4'-diphenylether diisocyanate, 2,4-tolylene diisocyanate, 2,6-tolylene diisocyanate, 1-methoxyphenyl-2,4-diisocyanate, isophorone diisocyanate, 4,4'-dicyclohexylmethane diisocyanate, and tetramethyl xylene diisocyanate, which may be used alone or in a combination thereof.

The carbodiimide catalyst may include phospholene oxides, such as 1-phenyl-2-phospholene-1-oxide, 3-methyl-2-phospholene-1-oxide, 1-ethyl-3-methyl-2-phospholene-1-oxide, 1-ethyl-2-phospholene-1-oxide, 3-phospholene and isomers thereof.

In addition, these high-molecular weight polycarbodiimides may be obtained by synthesis or from commercially available products. Commercially available products of the component may include CARBODILITE® (Nisshinbo Chemical Inc.), specifically CARBODILITE® V-01, V-03, V-05, V-07 and V09, which have excellent compatibility with organic solvents.

The crosslinking agent may be present in an amount of about 1 to about 10 parts by weight, e.g., about 4 to about 9 parts by weight or about 4.5 to about 7 parts by weight, based on 100 parts by weight of the (meth)acrylate copolymer. Within the range, a desired gel fraction as well as excellent peel strength may be obtained.

Silane Coupling Agent

The adhesive composition may further include a silane coupling agent to further improve adhesion stability and adhesion reliability.

Examples of the silane coupling agent may include, e.g., γ-glycidoxypropyltrimethoxysilane, γ-glycidoxypropylmethyldiethoxysilane, γ-glycidoxypropyltriethoxysilane, 3-mercaptopropyltrimethoxysilane, vinyltrimethoxysilane, vinyltriethoxysilane, γ-methacryloxypropyltrimethoxysilane, γ methacryloxypropyltriethoxysilane, γ-aminopropyltriethoxysilane, 3 isocyanatepropyltriethoxysilane, γ-acetoacetatepropyltrimethoxysilane, and the like. The silane coupling agent may be used alone or in combination of two or more kinds thereof.

The silane coupling agent may be included in an amount of about 0.01 to about 5 parts by weight, e.g., about 0.05 to about 1 part by weight, based on 100 parts by weight of the (meth)acrylate copolymer. Within the range, adhesion stability and adhesion reliability of an adhesive may be improved.

In an implementation, the adhesive composition may further include an additive, e.g., a UV stabilizer, an antioxidant, a coloring agent, a reinforcing agent, a filler, an anti-foaming agent, a surfactant, a plasticizer, and the like.

The adhesive composition may be prepared according to any suitable method. For example, the adhesive composition may be prepared by uniformly mixing a (meth)acrylate copolymer with a thermal initiator, the crosslinking agent, and the silane coupling agent. If desired, a solvent may be added for dilution.

By controlling the curing rate, an adhesive prepared from the adhesive composition of an embodiment may have a high gel fraction, high modulus, and an interpenetrating structure. For example, the adhesive composition may form an adhesive having a gel fraction of about 83% to about 95%, e.g., about 85% to about 93%, as defined by Equation 1:

$$\text{Gel fraction }(\%) = (A/B) \times 100, \qquad \text{[Equation 1]}$$

In Equation 1, A is a mass measured after dissolving the adhesive composition in a solvent at room temperature e.g., 23° C., for 48 hours and then drying for 24 hours, and B is an initial mass.

The adhesive composition may be coated on an optical film and then aged to form an adhesive layer. In an implementation, the adhesive layer may have a storage modulus of about $8 \times 10^5$ to about $1 \times 10^8$ dyne/cm$^2$, e.g., about $1 \times 10^6$ to about $1 \times 10^7$ dyne/cm$^2$, at 25° C.

Another embodiment provides an optical member prepared using the adhesive composition. The optical member may include an adhesive layer (prepared from the adhesive composition) on one or either side of an optical film. A method of forming the adhesive layer on the optical film is not particularly limited. For example, the adhesive composition may be directly applied to a surface of the optical film and then dried. Alternatively, the adhesive layer may be formed on a releasable substrate and then transferred to the optical film. The adhesive layer may be formed to a thickness of about 10 μm to about 100 μm, e.g., about 20 μm to about 70 μm.

The optical member may have a brightness difference ΔL of less than about 1, e.g., about 0.01 to about 0.8 or about 0.01 to about 0.5, between edge portions of the optical member and a center portion of the optical member, as defined by the following Equation 2:

$$\Delta L=[(a+b+d+e)/4]-c \qquad \text{[Equation 2]}$$

In Equation 2, a, b, d, and e are average brightness in an area occupying 1/16 of a total area from an end of each side of the optical member, and c is average brightness in an area occupying 1/32 of a total area at the center portion of the optical member.

The optical film may include, e.g., a polarizing plate, a color filter, a phase difference film, an elliptic polarization film, a reflective film, an anti-reflective film, a compensation film, a brightness-improving film, an alignment film, a diffusion film, a shatter preventing film, a surface-protecting film, a plastic LCD substrate, or the like.

The following Examples illustrate the embodiments in more detail. However, they are exemplary embodiments of the present invention and are not limiting. Moreover, the Comparative Examples are set forth to highlight certain characteristics of certain embodiments and are not to be construed as either limiting the scope of the invention as exemplified in the Examples or as necessarily always being outside the scope of the invention in every respect.

Examples

Components used in the following examples and comparative examples are as follows:

(A) (Meth)Acrylate Copolymer (A1) First (meth)acrylate resin having glass transition temperature of about 200K to about 250K 98.5 parts by weight of n-butylacrylate, 1 part by weight of hydroxyl ethylmethacrylate, and 0.5 parts by weight of acrylic acid were supplied into a 1 L flask while primarily purging with nitrogen gas. As a solvent, a predetermined amount of ethyl acetate was supplied into the flask; and nitrogen purging was performed for a predetermined period of time. Then, as an initiator, 0.05 parts by weight of 2,2'-azobis isobutyronitrile (AIBN) was supplied to the mixture. The temperature was adjusted to 60° C.±2; and 0.001 parts by weight of the initiator was supplied two times to minimize non-reacted monomers during reaction for 8 hours. The prepared first (meth)acrylate resin (A1) had a weight average molecular weight of 1,400,000 g/mol, a molecular weight distribution of 3.8, a glass transition temperature of 227K, and a solid content of 15%.

(A2) Second (meth)acrylate resin having a glass transition temperature of about 250K to about 300K The (meth)acrylate resin (A2) was prepared by the same manner except that 60 parts by weight of n-butylacrylate was used (instead of 98.5 parts by weight of n-butylacrylate), and 23.5 parts by weight of methylacrylate, 15 parts by weight of methylmethacrylate, 1 part by weight of hydroxylethyl methacrylate, and 0.5 parts by weight of acrylic acid were used. The prepared second (meth)acrylate resin (A2) had a weight average molecular weight of 800,000 g/mol, a molecular distribution of 4.7, a glass transition temperature of 265K, and a solid content of 25%.

(B) Crosslinking Agent (B1) Trimethylolpropane-modified tolylene diisocyanate (Coronate L; Nippon Polyurethane) was used as an isocyanate crosslinking agent.

(B2) Polycarbodiimide methyl diisocyanate (V09, Nishinbo Chemical) was used as an imide-based crosslinking agent.

(C) Silane Coupling Agent

γ-glycidoxypropylmethoxysilane (KBM-403; Shin-Etsu Chemical) was used.

Examples 1-3 and Comparative Examples 1-4

The above components were mixed as described in Table 1 and, after adding 30 parts by weight of ethyl acetate, stirred for 20 minutes to obtain a homogenous mixture. The prepared mixture solution was coated in a thickness of 25 pun on a polarizing plate and then aged for 72 hours. Thereafter, physical properties were evaluated as follows.

Physical Properties (1) Gel fraction: After dissolving 1.0 to 2.0 g samples in toluene (20 mL) for 48 hours at room temperature (23° C.) and drying for 24 hours, gel fraction was calculated as a percentage of the initial mass, according to Equation 1:

$$\text{Gel fraction (\%)}=(A/B)\times 100, \qquad \text{[Equation 1]}$$

As noted above, in Equation 1, A is the mass of the adhesive measured after dissolving the adhesive composition at room temperature (23° C.) for 48 hours in toluene and then drying for 24 hours, and B is the initial mass of the adhesive.

(2) Appearance: Color and transparency were evaluated through visual inspection.

(3) Peel strength: 180° peeling force between the adhesive and a glass substrate was measured according to JIS 2107. Samples were cut to 25×100 mm and laminated on the glass surface. Then, after connecting the adhesive layer and the glass substrate to upper and lower jigs in a 30 kgf load cell using a texture analyzer, load was measured while performing peeling at a tensile speed of 300 mm/min.

(4) Reworkability and cutability: A 400×250 mm polarizer plate coated with the adhesive composition was cut with a Thomson cutter. After observation of the cut cross-section of the adhesive layer, followed by lamination with a glass substrate, a pressure of 4~5 kg/cm² was applied to prepare a sample. After storage at 70° C. for 6 hours and slow cooling to room temperature for over 1 hour, rework was carried out. Presence or absence of residues on the glass substrate was observed and noted as follows: ○: No adhesive residues on the cut cross-section (No transfer during rework), Δ: Slight adhesive residues on the cut cross-section (Slight transfer during rework), and ×: Prominent adhesive residues on the cut cross-section (Transfer occurred during rework).

(5) Light leakage: After turning on an LCD device, brightness of a front side of the display panel was measured at a height of 1 m using a brightness measuring instrument. A degree of light leakage was quantitated from the difference of brightness between the center portion and the edge portions. The brightness difference ΔL was calculated according to the following Equation 2. A lower ΔL value represents better light leakage characteristics.

$$\Delta L=[(a+b+d+e)/4]-c \qquad \text{[Equation 2]}$$

As noted above, in Equation 2, a, b, d, and e are average brightness in an area occupying 1/16 of the total area from an end of each side of the optical member, and c is average brightness in an area occupying 1/32 of the total area at the center portion of the optical member. (See FIG. 1)

(6) Creep: The polarizing plate was attached to a glass substrate with an adhesion area of 1.5×1.5 cm. After storage at room temperature for 3 days, creep was evaluated by measuring the displacement distance (mm) when a force of 3 kgf was applied to the sample for 15 minutes, using a universal testing machine (UTM).

(7) Tack (gf): A probe was pressed into the adhesive surface of the sample at 200 gf for 20 sec and then released while measuring change of the force with a TA-analyzer. This test was performed at 25° C.

(8) Durability/reliability: A 100×175 mm polarizing plate coated with the adhesive composition was laminated on a glass substrate and a pressure of 4~5 kg/cm² was applied to prepare a sample. In order to investigate thermal/humidity resistance, the sample was kept at 60° C. and a R.H. of 90% for 500 hours; and visual inspection was performed to identify foaming or peeling. Thermal resistance was tested after keeping the sample at 80° C. for 500 hours. In both cases, the samples were observed visually or under a microscope after storage at room temperature for over 1 hour. Thermal impact was applied to the samples from −40° C. to 85° C. for 100 cycles; and the samples were then kept at room temperature for 1 hour, followed by observation to identify foaming or peeling. The observations were noted as follows: ○: No foaming or peeling, Δ: Slight foaming or peeling, x: Prominent foaming or peeling (9) Storage modulus (dyne/cm²): Adhesive layers were stacked to prepare a specimen having a diameter of 8 mm and a thickness of 1 mm. Storage modulus was measured at 10 rad/s using a rheometer while elevating the temperature from 20° C. to 120° C. at a rate of 5° C./min.

The results are shown in Table 1 of FIG. 2.

As may be seen in Table 1, the adhesives of Examples 1 to 3 exhibited well-balanced and good physical properties in terms of appearance, peel strength, reworkability, light leakage, creep, adhesion and reliability. In contrast, the adhesives of Comparative Examples 1 to 4, wherein the gel fraction and storage modulus were outside those of the embodiments, exhibited unsatisfactory light leakage and poor reliability.

By way of summation and review, the polarizing plate may include, e.g., iodine compounds or dichroic polarizing materials aligned in a predetermined direction. Protective films of, e.g., triacetylcellulose (TAC), may be formed on both sides of the polarizing plate to protect the polarizing plate. In addition, the polarizing plate may include a phase difference film (with molecules aligned in one direction) or a view-angle compensation film (such as a liquid crystal film). Each of these films may have different physical properties because they are made from materials with different molecular structures and compositions. For example, under high-temperature and/or high-humidity conditions, dimensional stability of the polarizing plate may decrease as materials with molecules aligned in one direction contract or expand. Accordingly, if the polarizing plate contracts or expands under the high-temperature and/or high-humidity conditions in the state in which the polarizing plate is fixed by an adhesive, stress may be concentrated at the TAC layer, causing birefringence and leakage of light. This is called a light leakage phenomenon, which may occur as optical isotropy of a stretched polarization film is degraded due to film contraction in high-temperature, high-humidity environments.

Reduction of film contraction by increasing a molecular weight of a composition of an adhesive or by increasing a crosslinking density may be considered. In this regard, the embodiments may overcome various defects and reduced durability. Thus, improvement of the crosslinking density as well as durability by supplementing heat curing with UV curing has been considered.

Prevention of light leakage may include a stress relieving scheme and a stress reinforcing scheme.

In this regard, the embodiments may overcome drawbacks associated with contamination of an adherend or reduction in durability over time, which may occur during the stress relieving scheme, e.g., addition of low molecular weight additives. In addition, the embodiments may provide lower brightness at a portion where light leakage occurs and may be regarded as true prevention of light leakage because a light-leaking area may be smaller.

The embodiments may provide an adhesive sheet curable by thermal curing, rather than UV/EB curing. Thus, drawbacks associated with UV/EB curing, e.g., additional facilities for UV irradiation and poor process characteristics, may be avoided.

The embodiments provide an adhesive composition capable of reducing or preventing light leakage by increasing the modulus of an adhesive through densification of a matrix. The adhesive composition may reduce or prevent light leakage by using a thermosetting type interpenetrating polymer and may have excellent durability and peel strength through blending effects of polymer compounds. The adhesive composition may prevent light leakage not only in a small/medium size device but also in a large size device. The adhesive composition may not contain an oligomer type molecular compound and thus may have excellent durability under high temperature and high humidity. The adhesive composition may secure desired physical properties while decreasing aging time. Further, the adhesive composition may be a thermosetting type stress reinforcing compound. The embodiments also provide an optical member formed using the adhesive composition to thereby have excellent property balances such as creep properties, peel strength, durability, reworkability, and cutability.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. An adhesive composition, comprising:
a (meth)acrylate copolymer, an isocyanate crosslinking agent, and an imide-based crosslinking agent, the (meth)acrylate copolymer including:
a first (meth)acrylate resin of about 50 wt % to less than 100 wt % of the (meth)acrylate copolymer, the first (meth)acrylate resin having a glass transition temperature of about 200 K to about 250 K and a weight average molecular weight of about 800,000 to about 3,000,000 g/mol, and
a second (meth)acrylate resin of greater than 0 wt % to about 50 wt % of the (meth)acrylate copolymer, the second (meth)acrylate resin having a glass transition temperature of about 250 K to about 300 K and a weight average molecular weight of about 100,000 to about 800,000 g/mol, and the adhesive composition providing an adhesive having a storage modulus of about $8 \times 10^5$ to about $1 \times 10^8$ dyne/cm$^2$ and a gel fraction of about 83% to about 95% as defined by Equation 1:

Gel fraction (%)=($A/B$)×100, [Equation 1]

in Equation 1, A is a mass of the adhesive measured after dissolving the adhesive at 23° C. for 48 hours in a solvent and then drying for 24 hours, and B is an initial mass of the adhesive formed from the adhesive composition.

2. The adhesive composition as claimed in claim 1, wherein the second (meth)acrylate resin is copolymerized with a monomer having a glass transition temperature of about 253.15 K to about 423.15 K.

3. The adhesive composition as claimed in claim 2, wherein the monomer having a glass transition temperature of about 253.15 K to about 423.15 K includes at least one of methylmethacrylate, methylacrylate, butylmethacrylate, and isobutylmethacrylate.

4. The adhesive composition as claimed in claim 1, wherein:
the first (meth)acrylate resin is prepared by polymerization of a monomer mixture, the monomer mixture including a $C_{1-20}$ alkyl(meth)acrylate, a monomer having a hydroxyl group, and a monomer having a carboxyl group, and
the second (meth)acrylate resin is prepared by polymerization of another monomer mixture, the other monomer mixture including a $C_{1-20}$ alkyl(meth)acrylate, a monomer having a hydroxyl group, and a monomer having a carboxyl group.

5. The adhesive composition as claimed in claim 1, wherein the adhesive composition includes 100 parts by weight of the (meth)acrylate copolymer; about 1 to about 10 parts by weight of the crosslinking agents; and about 0.01 to about 5 parts by weight of a silane coupling agent.

6. The adhesive composition as claimed in claim 1, wherein a weight ratio of the isocyanate crosslinking agent to the imide-based crosslinking agent is from about 100:1 to about 350:1 in the cross-linking agent.

7. The adhesive composition as claimed in claim 1, wherein the crosslinking agent includes about 3 to about 9 parts by weight of the isocyanate crosslinking agent and about 0.01 to about 1 parts by weight of the imide-based crosslinking agent, based on 100 parts by weight of the (meth)acrylate copolymer.

8. An optical member, comprising an adhesive layer on at least one side of an optical film, the adhesive layer being prepared from the adhesive composition as claimed in claim 1.

9. The optical member as claimed in claim 8, wherein the optical member has a brightness difference ΔL of less than about 1 between edge portions thereof and a center portion thereof, the brightness difference ΔL being defined by the following Equation 2:

ΔL=[($a+b+d+e$)/4]−$c$, [Equation 2]

in Equation 2, a, b, d, and e are each an average brightness of an area at an end of each respective side of the optical member, each area occupying 1/16 of a total area of the optical member, respectively, and c is an average brightness in an area occupying 1/32 of the total area at a center portion of the optical member.

* * * * *